United States Patent
Uchiuzo et al.

(10) Patent No.: US 8,591,153 B2
(45) Date of Patent: Nov. 26, 2013

(54) PNEUMATIC DRILLING DEVICE

(75) Inventors: Hideki Uchiuzo, Namerikawa (JP);
Minoru Ihara, Uozu (JP)

(73) Assignee: Sugino Machine Limited, Uozu-Shi (JP)

( * ) Notice: Subject to any disclaimer, the term of this patent is extended or adjusted under 35 U.S.C. 154(b) by 919 days.

(21) Appl. No.: 12/659,803

(22) Filed: Mar. 22, 2010

(65) Prior Publication Data
US 2010/0247254 A1 Sep. 30, 2010

(30) Foreign Application Priority Data
Mar. 27, 2009 (JP) ................................ 2009-078312

(51) Int. Cl.
*B23B 47/22* (2006.01)
*B23B 47/24* (2006.01)

(52) U.S. Cl.
USPC ............. 408/130; 408/702; 408/17; 173/206; 173/11

(58) Field of Classification Search
USPC ............. 408/130, 702, 17; 173/4, 11, 13, 15, 173/206
See application file for complete search history.

(56) References Cited

U.S. PATENT DOCUMENTS

| 3,546,976 A | * | 12/1970 | Clapp et al. | 408/59 |
| 3,577,808 A | * | 5/1971 | Visser | 408/61 |
| 3,868,195 A | * | 2/1975 | Anderson et al. | 408/61 |
| 4,752,161 A | * | 6/1988 | Hill | 408/67 |
| 4,867,617 A | * | 9/1989 | Maass et al. | 408/17 |
| 5,890,848 A | * | 4/1999 | Kachich | 408/1 R |
| 6,702,531 B2 | * | 3/2004 | Linderholm | 409/200 |
| 6,872,036 B2 | * | 3/2005 | Linderholm | 409/200 |
| 7,303,363 B2 | * | 12/2007 | Krause et al. | 408/130 |

FOREIGN PATENT DOCUMENTS

| JP | A-2005-161452 | 6/2005 |
| JP | A-2008-110473 | 5/2008 |

* cited by examiner

*Primary Examiner* — Essama Omgba
*Assistant Examiner* — Jason L Vaughan
(74) *Attorney, Agent, or Firm* — Oliff & Berridge, PLC (57) ABSTRACT

The pneumatic drilling device includes: a ram provided inside a cylindrical body so that the ram can move forward and backward therein; a spindle air motor provided inside the ram; a feed air cylinder mechanism for moving the ram forward and backward; and an air supply port for supplying compressed air to the feed air cylinder mechanism and the spindle air motor through an airflow path. The airflow path includes: a first flow path for driving the spindle air motor; and a second flow path communicating with the feed air cylinder mechanism for moving the ram forward and backward. The first flow path and the second flow path are separately and independently provided in parallel.

4 Claims, 7 Drawing Sheets

FIG. 7

PNEUMATIC DRILLING DEVICE

BACKGROUND OF THE INVENTION

1. Field of the Invention

The present invention relates to a pneumatic drilling device, and more particularly, to a pneumatic drilling device suitable for the drilling process of composite materials.

2. Description of the Related Art

In recent years, CFRP (Carbon Fiber Reinforced Plastics) have been used in aircraft parts or the like, and composite materials such as CFRP/Aluminum and CFRP/Titanium has been increased.

However, it is known that high-precision drilling of such composite materials is difficult due to the differences in cutting conditions. Therefore, for example, there is employed a drilling method for maintaining the advance per revolution of a spindle constant by synchronizing feed and rotation with a single motor (for example, see Japanese Published Unexamined Patent Application Nos. 2005-161452 and 2008-110473). That is, variations in speed of the motor have no effect on the rate of advance per revolution, and therefore the thickness of the swarf formed remains constant, thereby promoting the surface quality and precision of the drilled holes.

However, when feed and rotation is synchronized by a single motor, the feed rate is fixed, and, in the case of composite materials, the feed rate is determined according to the conditions of firm materials. Thus, in the past, there has been a problem that a lot of machining time is required. Further, when spindle rotation speed is reduced under load, the feed rate is also reduced in synchronization, and therefore a lot of machining time is required again. In addition, cutting is performed at a feed rate set regardless of wear and tear on a cutting tool. This might cause not only the reduction in processing quality but also the breakage of a workpiece.

SUMMARY OF THE INVENTION

Accordingly, the present invention has been made in view of the foregoing, and an object of the present invention is to provide a pneumatic drilling device that allows easy setting of the machining conditions suitable for a workpiece of various materials to improve operability and is suitable for the processing of composite materials.

In order to address the above-described problems, according to an aspect of the present invention, a pneumatic drilling device for drilling by allowing a drill to feed while rotating, includes: a cylindrical body; a ram provided inside the body so that the ram can move forward and backward therein; a spindle air motor provided inside the ram for rotating the drill; a feed air cylinder mechanism for moving the ram forward and backward; and an air supply port for supplying compressed air to the feed air cylinder mechanism and the spindle air motor through an airflow path. The airflow path includes: a first flow path for supplying compressed air for driving the spindle air motor; and a second flow path communicating with the feed air cylinder mechanism for supplying compressed air for moving the ram forward and backward. The first flow path and the second flow path is separately and independently provided in parallel.

As described above, according to an aspect of the invention, the first flow path for supplying the compressed air for driving the spindle air motor, and the second flow path for supplying the compressed air for moving the ram forward and backward are separately and independently provided. Thus, respective adjustments of the rotational speed (spindle rotation speed) of the spindle air motor and the reciprocating movement speed (feed speed) of the ram can be independently performed.

Also, the first flow path and the second flow path are provided in parallel. Thus, the machining thrust force suitable for a workpiece of various materials can be easily set by limiting the pressure in a forward movement flow path of the second flow path without changing the pressure in the first flow path.

By setting the machining thrust force suitable for a workpiece in this manner, it is possible to notice the wear and tear on a cutting tool by length of machining time.

In addition, the pneumatic drilling device is configured to operate through the supply of compressed air. Thus, the rotational speed of the spindle air motor and the reciprocating movement speed of the ram also vary depending on the variations of load during drilling processing. For example, in the case of a free-cutting workpiece, the cutting resistance and load is small, and therefore the spindle rotation speed and the feed speed do not decrease. On the other hand, in the case of a workpiece having poor machinability, the cutting resistance and load is large, and therefore the spindle rotation speed and the feed speed decrease.

Therefore, in the case of drilling a composite member composed of a free-cutting material and a material having poor machinability, once the machining conditions for the free-cutting material are set, due to an increase in cutting resistance at a portion of the material having poor machinability, the spindle rotation speed and the feed speed decrease, and the machining tilts toward the machining conditions for the material having poor machinability, thereby allowing completion of the machining in an efficient machining time for the quality of the material. Accordingly, the pneumatic drilling device according to an aspect of the present invention is particularly suitable for the drilling process of composite members.

Preferably, the second flow path includes a forward movement flow path for moving the ram forward, and the forward movement flow path is provided with a pressure adjuster for adjusting forward movement thrust force.

With this configuration, it is possible to adjust only the forward movement thrust force of the ram without reducing the backward movement thrust force.

The first flow path may include a motor flow path for driving the spindle air motor, and a second forward-movement flow path branched from the motor flow path for moving the ram forward.

The configuration in which the second forward-movement flow path for moving the ram forward is provided, allows an increase in feed thrust force of the rum.

Also, since the second forward-movement flow path is branched from the motor flow path for driving the spindle air motor, the feed thrust force of the ram and the rotational speed of the motor is fine adjusted, thereby allowing the setting of the machining conditions more suitable for a workpiece and the reduction in machining time.

The pneumatic drilling device may further include: an exhaust flow path formed on an outer circumferential portion of the ram for discharging the compressed air supplied to the spindle air motor; and an extension member extending at a rear of the ram and having an exhaust port, wherein the exhaust flow path communicates with the exhaust port to discharge the compressed air out of the exhaust port.

With the configuration in which the extension member extending at the rear of the ram is provided with the exhaust port for allowing the compressed air to be discharged therethrough, it is possible to prevent a workpiece from being subjected to the compressed air. Thus, although the exhaust air includes turbine oil for lubricating the spindle air motor, it is possible to prevent a workpiece to be contaminated by the oil and improve the workability.

The exhaust flow path may include: a recess formed on the outer circumferential portion of the ram; an exhaust hole formed from an inner peripheral portion of the ram through the recess; and a ram case externally fitted to the outer circumferential portion over the recess, wherein the recess communicates with the exhaust port to discharge the compressed air. With this structure, it is possible to smoothly and reliably discharge the compressed air out of the rear of the ram.

The pneumatic drilling device may further include: a through-hole extending to a drill tip along an axial direction of the drill; a grasping member for grasping the drill; and a mist supply port formed on the grasping member to communicate with the through-hole, wherein there is provided a mist supplying device for supplying mist to the mist supply port to supply the mist to the drill tip.

With this configuration, it is possible reliably perform the cooling of the drill and the lubrication of the workpiece. Therefore, the machining conditions suitable for the workpiece are stably maintained, thereby allowing the reduction in machining time.

The pneumatic drilling device may further include: a nose piece provided at a front portion of the body for covering the drill; and a bush mounted on a leading end of the nose piece for supporting the drill, wherein drilling processing is performed with the bush engaged in a jig plate for positioning.

With this configuration, the positioning can be easily performed, and therefore it is possible to improve operability and reduce machining time.

BRIEF DESCRIPTION OF THE DRAWINGS

Embodiments of the present invention will be described in detail based on the following figures, wherein.

DETAILED DESCRIPTION OF PREFERRED EMBODIMENTS

Hereinafter, a pneumatic drilling device 1 according to an embodiment of the present invention will be described in detail with reference to the accompanying drawings as appropriate.

Figure 1:
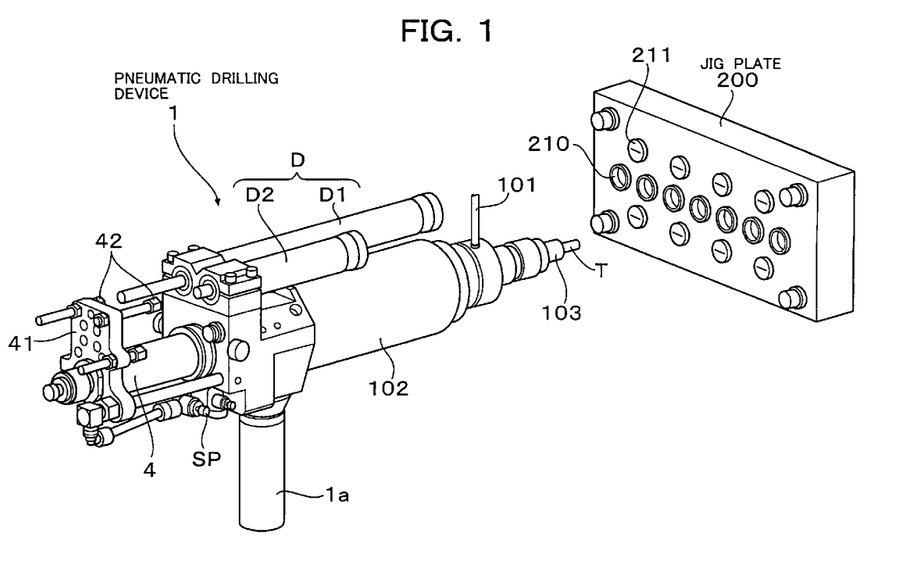
FIG. 1 is a perspective view showing a usage state of a pneumatic drilling device according to an embodiment of the present invention.

The pneumatic drilling device 1 is a hand tool in which a grip 1a is grasped by an operator (not shown), and the pneumatic drilling device 1 is inserted into a positioning bush 210 and locked with a setscrew 211 to perform drilling operations, as shown in FIG. 1. Drilling is performed by allowing a drill T to rotate and feed while supplying mist to a workpiece (not shown) from a mist supplying device (not shown).

The pneumatic drilling device 1 includes: a mist supply tube 101 for supplying mist to the workpiece from a tip of the drill T; a nose piece 102 provided at a front portion of a body 2 (FIG. 2) to cover the drill T; and a bush 103 mounted on a leading end of the nose piece 102 to support the drill T, and performs drilling process in such a manner that the bush 103 is engaged in the positioning bush 210 formed on a jig plate 200 for positioning.

This configuration, in which the drilling process is performed with the bush 103 engaged in the jig plate 200, allows easy positioning to improve operability and the reduction in machining time.

In the pneumatic drilling device 1 according to this embodiment of the present invention, for convenience of explanation, with reference to the state in which the pneumatic drilling device 1 is held by the operator, the side on which the drill T is mounted will be referred to as the front side (leading end side), and the opposite side will be referred to as the rear side. Likewise, the side to which the grip 1a is fixed will be referred to as the lower side, and the opposite side will be referred to as the upper side.

Figure 2:
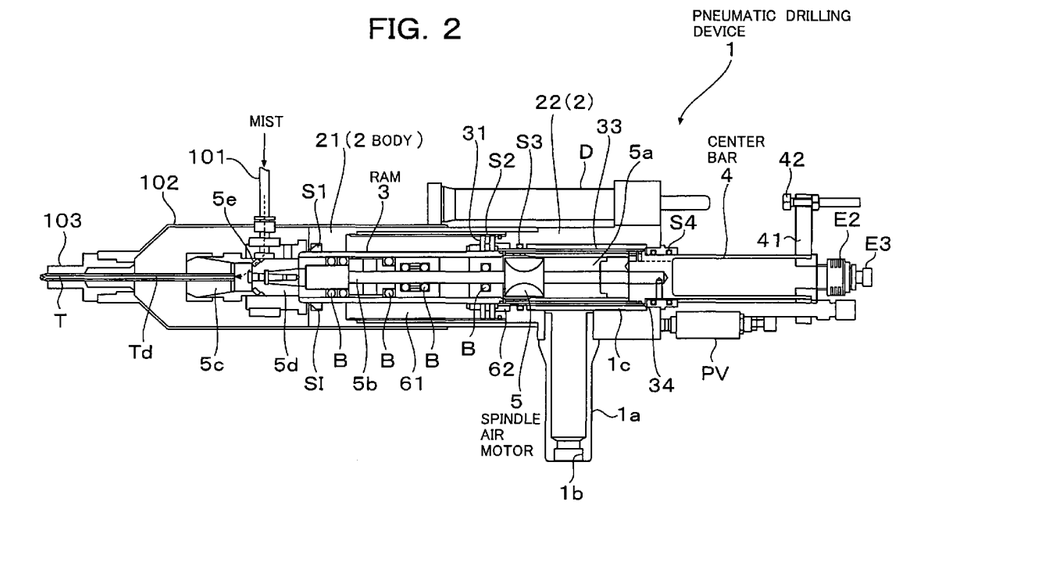
FIG. 2 is a sectional view showing the general configuration of the pneumatic drilling device according to an embodiment of the present invention.
Figure 5:
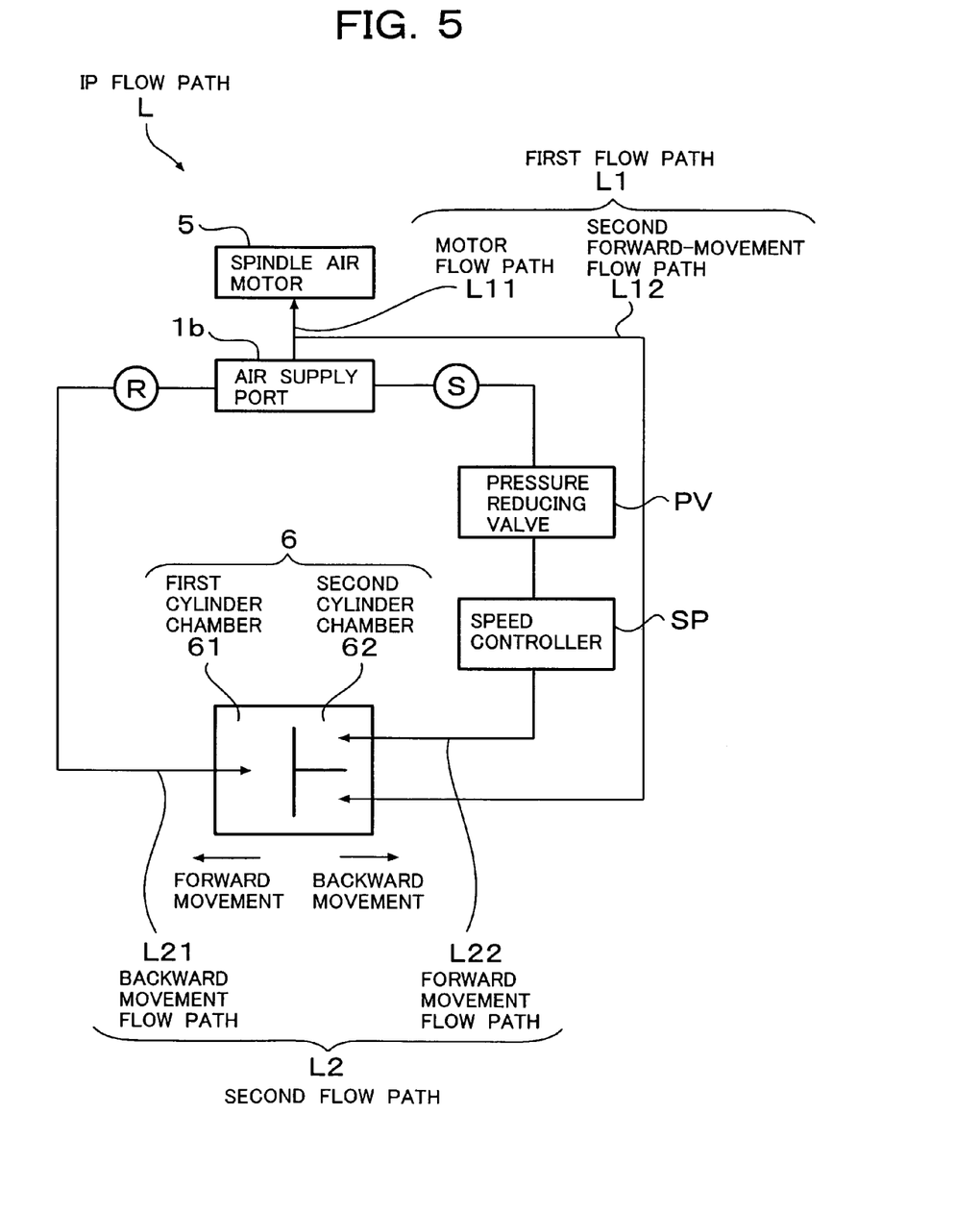
FIG. 5 is a circuit diagram for illustrating an airflow path of the pneumatic drilling device according to an embodiment of the present invention.

As shown in FIG. 2, the pneumatic drilling device 1 also includes: a ram 3 provided inside the body 2 so that the ram 3 can move forward and backward therein; a center bar 4 as an extension member extending at the rear of the ram 3 and having an exhaust port E2; a spindle air motor 5 provided inside the ram 3 to rotate the drill T; a feed air cylinder mechanism 6 (see FIG. 5) for moving the ram 3 forward and backward; and an air supply port 1b for supplying compressed air to the feed air cylinder mechanism 6 and the spindle air motor 5 through an airflow path L (FIG. 5).

The body 2 is cylindrical, and a front body 21 and a rear body 22 are threadedly engaged as a device in a central portion of the body 2, as shown in FIG. 2.

At an inner peripheral portion of the body 2, the ram 3 reciprocating (feed and return movements) therein is provided. The ram 3 is slidably supported by a front end portion, a central portion, and a rear end portion of the body 2, and is provided with a sealing portion S1 (leading end portion), sealing portions S2 and S3 (central portions), and a sealing portion S4 (rear end portion) so as to prevent leakage of compressed air.

Figure 3:
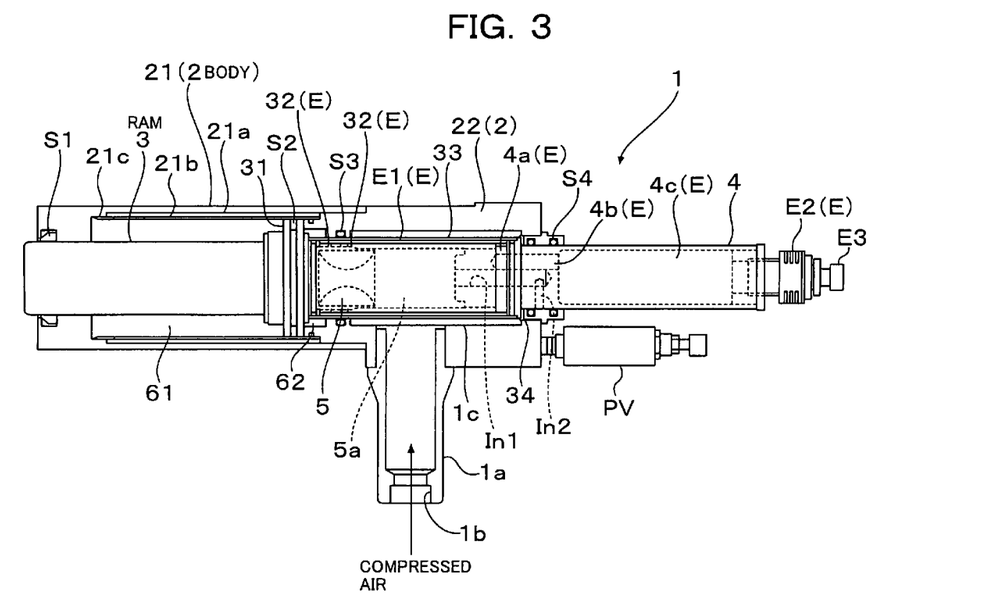
FIG. 3 is a sectional view of the essential parts showing the main configuration of the pneumatic drilling device according to an embodiment of the present invention.
Figure 7:
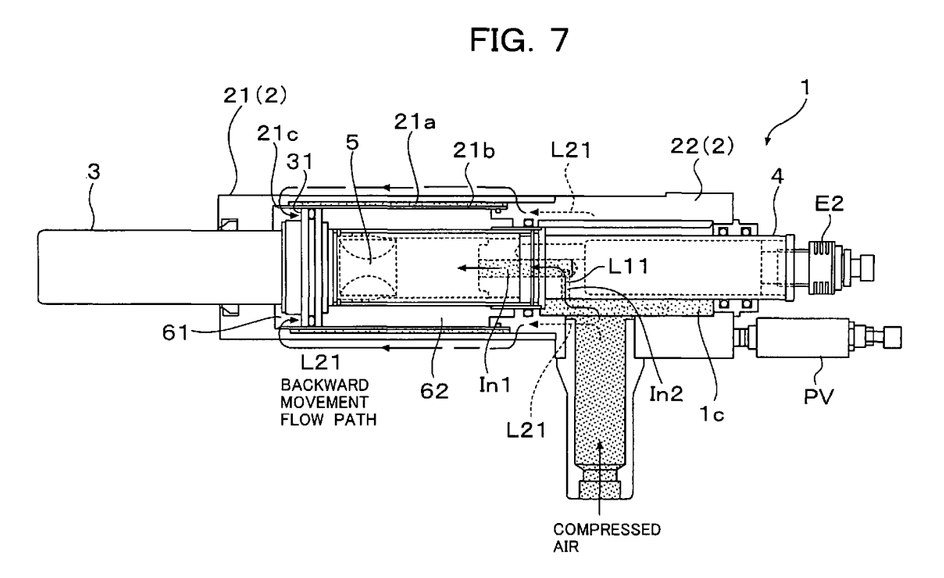
FIG. 7 is a sectional view of the essential parts for illustrating the operation of the pneumatic drilling device according to an embodiment of the present invention, showing the state in which the ram is located at a forward movement end to start to move backward.

As shown in FIG. 3, a first cylinder chamber 61 into which compressed air is introduced from the leading end side through a backward movement flow path L21 (FIG. 5), is formed at an inner peripheral portion of the front body 21 (see also FIG. 7).

More specifically, a recess 21a is circumferentially formed in an inner circumferential surface of the front body 21, and a cylinder case 21b is internally fitted over the recess 21a. Also, a through-hole 21c communicating with the recess 21a is formed in a leading end portion of the cylinder case 21b.

In this manner, the backward movement flow path L21 shown in FIG. 5 is configured, through which the compressed air for backward movement supplied to the recess 21a from the air supply port 1b is introduced into the first cylinder chamber 61, thereby moving the ram 3 backward (see also FIG. 7).

A second cylinder chamber 62 into which compressed air is introduced from the leading end side through a forward movement flow path L22 (FIG. 5), is formed at an inner peripheral portion of the rear body 22 (FIG. 2). The air for forward movement is introduced into the second cylinder chamber 62 through the forward movement flow path L22 shown in FIG. 5, thereby moving the ram 3 forward (see also FIG. 6).

A hydraulic damper D (D1 and D2; see FIG. 1) is mounted above the body 2. Also, adjust screws 42 and 42 are provided on the center bar 4 through a screw supporting plate 41 in such a manner as to face the hydraulic dampers D1 and D2.

With this configuration, the adjust screws 42 and 42 press the hydraulic damper D in response to the forward movement of the ram 3, and therefore the cutting rate of the ram 3 can be easily varied and adjusted in process of feeding, by setting, as appropriate, the damping force of the hydraulic damper D permitting the setting of a constant load.

Here, for example, the hydraulic damper D1 is used for adjusting the cutting rate of the ram 3, and the hydraulic damper D2 is used for adjusting the pre-exit low feed rate in the drilling process.

The grip 1a is fixed to a lower portion of the body 2. The grip 1a is provided with the air supply port 1b, and the air supply port 1b communicates with an air pressure chamber 1c formed on an outer circumferential portion of the ram 3.

The air pressure chamber 1c serves to temporarily store the compressed air introduced from the air supply port 1b through a motor flow path L11 (FIG. 5) and then supply the compressed air to the spindle air motor 5.

Figure 6:
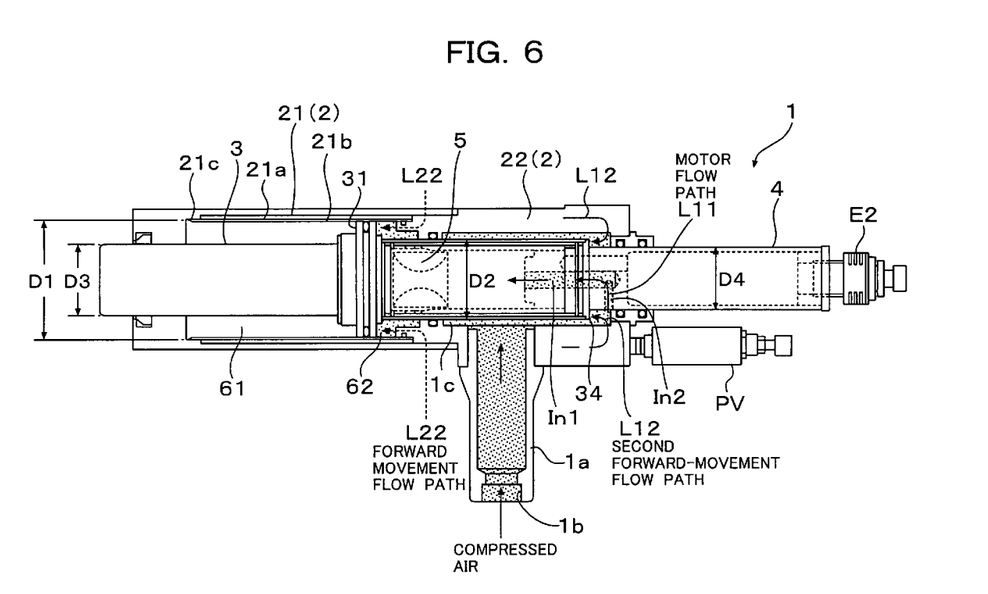
FIG. 6 is a sectional view of the essential parts for illustrating the operation of the pneumatic drilling device according to an embodiment of the present invention, showing the state in which a ram moves forward to start to rotate a spindle air motor.

That is to say, as shown in FIG. 6, when the ram 3 initiates feed motion and moves forward to allow an inlet flow path In2 formed on the center bar 4 to communicate with the air pressure chamber 1c, the compressed air stored in the air pressure chamber 1c is supplied to the spindle air motor 5 from the inlet flow path In2 through an inlet flow path In1 to rotate the spindle air motor 5.

As shown in FIG. 3, the ram 3 is cylindrically formed, and a flange-shaped enlarged diameter portion 31 is formed at a central portion on the outer circumference thereof. The enlarged diameter portion 31 moves forward and backward while being brought into slidable contact with an inner circumferential surface of the body 2. The sealing portion S2 described above is provided on the enlarged diameter portion 31.

An exhaust flow path Ex for discharging the compressed air supplied to the spindle air motor 5 is formed in an outer circumferential portion of the ram 3, as shown in FIG. 3.

The exhaust flow path Ex is composed of: a recess E1 formed on an outer circumferential portion of the ram 3; an exhaust hole 32 formed from an inner peripheral portion of the ram 3 to the recess E1; a ram case 33 externally fitted to the outer circumferential portion of the ram 3 over the recess E1; and conducting flow paths 4a, 4b, and 4c for allowing the recess E1 to communicate with the exhaust port E2 provided in the center bar 4.

Figure 4:
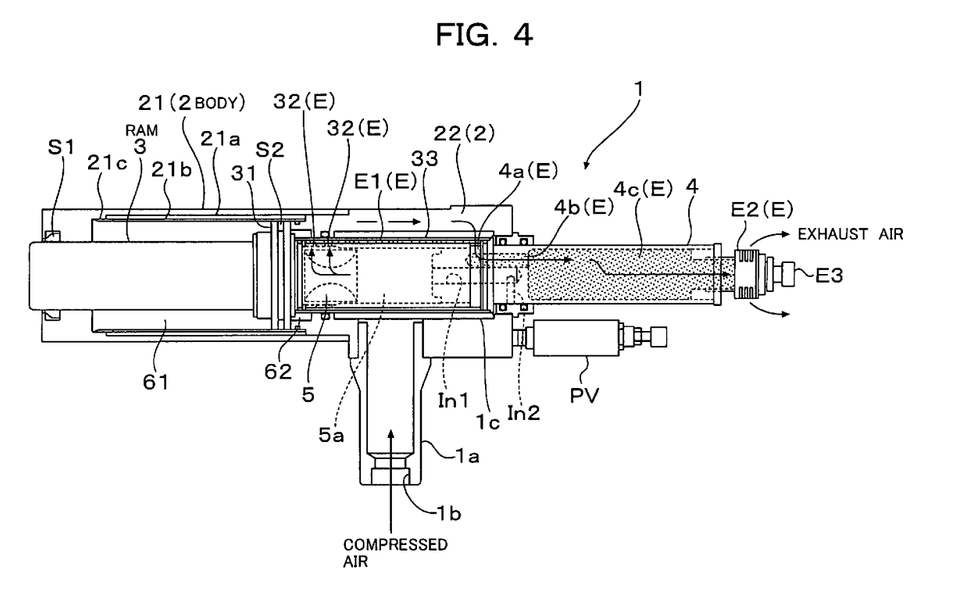
FIG. 4 is a sectional view of the essential parts for illustrating an exhaust flow path of the pneumatic drilling device according to an embodiment of the present invention.

With this configuration, as shown in FIG. 4, the compressed air supplied to the spindle air motor 5 is discharged from the exhaust hole 32 to the recess E1, and from there passes through the conducting flow paths 4a, 4b, and 4c to be discharged to the atmosphere from the exhaust port E2. An exhaust throttle valve E3 is provided on the exhaust port E2, and has the function of adjusting the rotational speed of the spindle air motor 5 by controlling the amount of exhaust air.

The recess E1 is formed rearwardly from the enlarged diameter portion 31, with a circumferential stepped portion extending to a rear end of the ram 3. The recess E1 serves as the exhaust flow path Ex by mounting the ram case 33 over the outer circumferential portion of the ram 3.

The exhaust hole 32 is formed, in the vicinity of an outer circumferential portion of the spindle air motor 5, through the recess E1 so as to communicate with the recess E1. The ram case 33 is formed in a thin cylindrical shape and externally fitted to the outer circumferential portion of the ram 3 behind the enlarged diameter portion 31.

The conducting flow path 4a is formed in such a manner as to deviate from the center radially parallel to the center bar 4 so as to be connected to the recess E1. The conducting flow path 4b is formed parallel to the axis of the center bar 4 in such a manner as to communicate with the conducting flow path 4a. The conducting flow path 4c is formed in such a manner as to communicate with the conducting flow path 4b, and extends to the rear end of the center bar 4 to lead to the exhaust port E2.

As shown in FIG. 3, the center bar 4 is formed in a solid-core bar shape, and extended with one end thereof inserted into a rear end 34 of the ram 3 to block the rear end 34. The center bar 4 is provided with the motor flow path L11 (FIG. 5) communicating with the air pressure chamber 1c for driving the spindle air motor 5, in addition to the conducting flow paths 4a, 4b, and 4c, and the exhaust port E2.

The motor flow path L11 (FIG. 5) includes the inlet flow path In1 formed along the axial direction from a leading end portion of the center bar 4, and the inlet flow path In2 radially formed to communicate with the inlet flow path In1. Also, the compressed air introduced from the air supply port 1b is temporarily stored in the air pressure chamber 1c, and, when the ram 3 moves forward to the position that allows the inlet flow path In2 to communicate with the air pressure chamber 1c, the compressed air is supplied to the spindle air motor 5.

The spindle air motor 5 is provided inside the ram 3, slightly rearward of the center of the ram 3, as shown in FIG. 2.

More specifically, an air motor chamber 5a provided with the spindle air motor 5 is formed at the rear of the inside of the ram 3. The spindle air motor 5 is rotated by the compressed air introduced into the air motor chamber 5a. On the other hand, bearings B for rotatably supporting a spindle 5b are provided in front of the inside of the ram 3. Also, a collet 5c as a grasping member for grasping the drill T and a collet holder 5d are connected to a leading end portion of the spindle 5b.

A mist supply port 5e is formed in the collet holder 5d. The mist supplied from the mist supplying device (not shown) through the mist supply tube 101 is supplied to the workpiece through a through-hole Td extending to the tip of the drill T.

It should be noted that the mist supplying device can be mounted on an upper portion of the body 2.

The feed air cylinder mechanism 6 is, as shown in FIG. 3, a mechanism for moving the ram 3 forward and backward by supplying compressed air to the first cylinder chamber 61 or the second cylinder chamber 62 through the airflow path L (see FIG. 5).

The first cylinder chamber 61 and the second cylinder chamber 62 are formed between an outer circumferential portion of the ram 3 and an inner circumferential portion of the body 2.

The first cylinder chamber 61 is formed in front of the enlarged diameter portion 31, and functions in such a manner that compressed air is introduced into the first cylinder chamber 61 through the backward movement flow path L21 (FIG. 5), thereby moving the ram 3 backward. On the other hand, the second cylinder chamber 62 is formed at the rear of the enlarged diameter portion 31, and functions in such a manner that compressed air is introduced into the second cylinder chamber 62 through the forward movement flow path L22 (FIG. 5), thereby moving the ram 3 forward.

As shown in FIG. 5, the air flow path L is composed of: a first flow path L1 for supplying the compressed air for driving the spindle air motor 5; a second flow path L2 communicating with the feed air cylinder mechanism 6; and the air supply port 1b for supplying compressed air to the first flow path L1 and the second flow path L2. Also, the first flow path L1 and the second flow path L2 are separately and independently provided in parallel.

Since the first flow path L1 and the second flow path L2 are separately and independently provided in this manner, respective adjustments of the rotational speed (spindle rotation speed) of the spindle air motor 5 and the reciprocating movement speed (feed speed) of the ram 3 can be independently performed.

The first flow path L1 includes the motor flow path L11 for driving the spindle air motor 5, and a second forward-movement flow path L12 branched from the motor flow path L11 for allowing the ram 3 to move forward.

The second forward-movement flow path L12 can provide the thrust force for moving the ram 3 forward by supplying the compressed air to the rear end 34 of the ram 3 (see FIG. 6).

As described above, the second flow path L2 includes the second forward-movement flow path L12. As a result, the second flow path L2 substantially includes it is called a second cylinder that causes a feed thrust force, in addition to the feed thrust force caused by the compressed air supplied to the second cylinder chamber 62 from the forward movement flow path L22. Therefore, the feed thrust force of the ram 3 can be increased.

More specifically, as shown in FIG. 6, feed thrust force (F1) of the ram 3 caused by the forward movement flow path L22 corresponds to the value obtained by multiplying a section area of $\phi D1$-$\phi D2$ by the air pressure acting on the air supply port 1b. Also, feed thrust force (F2) of the ram 3 caused by the second forward-movement flow path L12 corresponds to the value obtained by multiplying a section area of $\phi D2$-$\phi D4$ by the air pressure acting on the air supply port 1b. Accordingly, the feed thrust force of the ram 3 is F1+F2. In this manner, by adding the feed thrust force F2 to the rear end 34 of the ram 3, it is possible to increase the feed thrust force without increasing the cylinder diameter $\phi D1$ of the ram 3.

The second flow path L2 (FIG. 5) includes: the backward movement flow path L21 that supplies the compressed air for moving the ram 3 backward to the first cylinder chamber 61; a return button R provided on the backward movement flow path L21; the forward movement flow path L22 that supplies the compressing air for moving the ram 3 forward to the second cylinder chamber 62; a pressure regulator PV as a pressure adjuster provided on the forward movement flow path L22; a pressure compensated flow control SP (see FIG. 1); and a start button S.

The pressure regulator PV is mounted behind the grip 1a (see FIG. 2), and functions to adjust the forward movement thrust force of the rum 3 by reducing the pressure of the compressed air. The pressure compensated flow control SP (FIG. 1) functions to allow the fine adjustment of fast-forward movement speed of the ram 3.

The operation of the pneumatic drilling device 1 according to this embodiment configured as above will be described, mainly with reference to FIGS. 4 to 7.

According to the pneumatic drilling device 1 according to this embodiment, as shown in FIG. 5, when the start button S is pressed, the compressed air supplied to the air supply port 1b is guided into the second cylinder chamber 62 through the forward movement flow path L22 via the pressure regulator PV and the pressure compensated flow control SP, thereby moving the ram 3 forward.

When the ram 3 moves forward to the position where the inlet flow path In2 communicates with the air pressure chamber 1c, the compressed air is supplied to the spindle air motor 5 from the inlet flow path In2 through the inlet flow path In1 as shown in FIG. 6, to rotate the spindle air motor 5.

By setting, as appropriate, the timing to allow the inlet flow path In2 to communicate with the air pressure chamber 1c, therefore, it is possible to rotate the spindle air motor 5 at a predetermined timing. In this manner, drilling is performed by allowing the drill to feed while rotating (see FIG. 1).

On the other hand, when the return button R is pressed, as shown in FIG. 7, the compressed air supplied to the air supply port 1b is guided into the first cylinder chamber 61 through the backward movement flow path L21, thereby moving the ram 3 backward.

When the ram 3 moves backward and then further backward from the position where the inlet flow path In2 communicates with the air pressure chamber 1c, the communication between the inlet flow path In2 and the air pressure chamber 1c is cut off, resulting in the stop of the spindle air motor 5 (see FIG. 3).

The return button R causes backward movement during forward movement operations, in manual operation. In autoreturn operation, the return button R is automatically shifted to backward movement operations when the ram 3 reaches a predetermined forward movement end.

As described above, the pneumatic drilling device 1 according to an embodiment of the present invention is configured to operate through the supply of compressed air. Thus, the rotational speed of the spindle air motor 5 and the reciprocating movement speed of the ram 3 also vary depending on the variations of load during drilling processing. For example, in the case of a free-cutting workpiece, the cutting resistance and load is small, and therefore the spindle rotation speed and the feed speed do not decrease. On the other hand, in the case of a workpiece having poor machinability, the cutting resistance and load is large, and therefore the spindle rotation speed and the feed speed decrease.

Therefore, in the case of drilling a composite member composed of a free-cutting material and a material having poor machinability, once the machining conditions for the free-cutting material are set, due to an increase in cutting resistance at a portion of the material having poor machinability, the spindle rotation speed and the feed speed decrease, and the machining tilts toward the machining conditions for the material having poor machinability, thereby allowing completion of the machining in an efficient machining time for the quality of the material. Accordingly, the pneumatic drilling device 1 according to an embodiment of the present invention is particularly suitable for the drilling process of composite members.

In addition, the forward movement flow path L22 of the second flow path L2 for allowing the ram 3 to move forward is provided with the pressure regulator PV for adjusting the forward movement thrust force, thereby allowing adjustment of only the forward movement thrust force of the ram 3 without reducing the backward movement thrust force.

Although an embodiment of the present invention has been described above, it should be understood that the invention is not limited to the above-described embodiment, but may be practiced with various changes.

For example, according to this embodiment, the drilling process is performed in such a manner that the bush 103 mounted on the leading end of the nose piece 102 is engaged in the positioning bush 210 formed on the jig plate 200, however, the invention is not limited to this embodiment, but also can include embodiments having no bush 103.

What is claimed is:

1. A pneumatic drilling device for drilling by allowing a drill to feed while rotating, comprising:
   a cylindrical body;
   a ram provided inside the body so that the ram can move forward and backward therein;
   a spindle air motor provided inside the ram for rotating the drill;
   a feed air cylinder mechanism for moving the ram forward and backward; and
   an air supply port for supplying compressed air to the feed air cylinder mechanism and the spindle air motor through an airflow path, the airflow path having:
   a first flow path for supplying compressed air for driving the spindle air motor;
   a second flow path communicating with the feed air cylinder mechanism for supplying compressed air for moving the ram forward and backward, the first flow path and the second flow path being separately and independently provided in parallel, wherein:
      the second flow path includes a forward movement flow path for moving the ram forward, and the forward movement flow path is provided with a pressure adjuster for adjusting forward movement thrust force, and
      the first flow path includes a motor flow path for driving the spindle air motor, and a second forward-movement flow path branched from the motor flow path for moving the ram forward;
   an exhaust flow path formed on an outer circumferential portion of the ram for discharging the compressed air supplied to the spindle air motor; and
   an extension member extending at a rear of the ram and having an exhaust port,
   wherein the exhaust flow path communicates with the exhaust port to discharge the compressed air out of the exhaust port.

2. The pneumatic drilling device according to claim 1, wherein the exhaust flow path includes:
   a recess formed on the outer circumferential portion of the ram;
   an exhaust hole formed from an inner peripheral portion of the ram to the recess; and
   a ram case externally fitted to the outer circumferential portion over the recess,
   wherein the recess communicates with the exhaust port to discharge the compressed air.

3. The pneumatic drilling device according to claim 1, further comprising:
   a through-hole extending to a drill tip along an axial direction of the drill;
   a grasping member for grasping the drill; and
   a mist supply port formed on the grasping member to communicate with the through-hole,
   wherein there is provided a mist supplying device for supplying mist to the mist supply port to supply the mist to the drill tip.

4. The pneumatic drilling device according to claim 1, further comprising:
   a nose piece provided at a front portion of the body for covering the drill; and
   a bush mounted on a leading end of the nose piece for supporting the drill,
   wherein drilling processing is performed with the bush engaged in a jig plate for positioning.

* * * * *